US010072900B2

United States Patent
Pettitt et al.

(10) Patent No.: US 10,072,900 B2
(45) Date of Patent: Sep. 11, 2018

(54) HEAT EXCHANGER DISTRIBUTOR WITH INTERSECTING STREAMS

(71) Applicant: MAHLE International GmbH, Stuttgart (DE)

(72) Inventors: Edward D. Pettitt, Newfane, NY (US); Carrie M. Kowsky, Lockport, NY (US)

(73) Assignee: MAHLE International GmbH, Stuttgart (DE)

( * ) Notice: Subject to any disclaimer, the term of this patent is extended or adjusted under 35 U.S.C. 154(b) by 861 days.

(21) Appl. No.: 14/487,244

(22) Filed: Sep. 16, 2014

(65) Prior Publication Data
US 2016/0076822 A1 Mar. 17, 2016

(51) Int. Cl.
F28F 9/02 (2006.01)
B60H 1/00 (2006.01)
F28D 21/00 (2006.01)

(52) U.S. Cl.
CPC ....... *F28F 9/0273* (2013.01); *B60H 1/00328* (2013.01); *F28D 2021/0085* (2013.01); *F28F 2265/28* (2013.01)

(58) Field of Classification Search
CPC ............. F28D 1/05383; F28D 1/05391; F28F 9/0273; F28F 9/22; F28F 2265/02
USPC .................................. 165/173, 174, 181
See application file for complete search history.

(56) References Cited

U.S. PATENT DOCUMENTS

| | | | | |
|---|---|---|---|---|
| 1,966,572 A | * | 7/1934 | Webb | A47L 15/16 134/200 |
| 3,466,980 A | * | 9/1969 | Achelpohl | B31B 19/00 493/189 |
| 3,818,984 A | * | 6/1974 | Nakamura | F28D 9/0018 165/157 |
| 3,976,128 A | * | 8/1976 | Patel | F25B 39/02 165/153 |
| 5,419,391 A | * | 5/1995 | Chan | F28D 7/06 122/32 |
| 5,987,893 A | * | 11/1999 | Schulz-Harder | F25B 21/02 136/204 |
| 6,158,503 A | * | 12/2000 | Gille | B60H 1/3227 165/132 |

(Continued)

FOREIGN PATENT DOCUMENTS

JP 2000292077 A 10/2000
JP WO 2013054540 A1 * 4/2013 ............ F28F 17/005
(Continued)

*Primary Examiner* — Raheena R Malik
(74) *Attorney, Agent, or Firm* — Brinks Gilson & Lione (57) ABSTRACT

A heat exchanger includes a header, a plurality of tubes, and a distributor. The header is configured to define an inlet for the heat exchanger. The tubes extend away from and are fluidically coupled to the header. The distributor is located within the header and is configured to distribute refrigerant flowing along a longitudinal axis from the inlet to the tubes via a plurality of openings defined by the distributor through a wall of the distributor. The openings include a first opening configured to direct refrigerant in a first direction, and a second opening configured to direct refrigerant in a second direction. The first direction and the second direction are selected such that refrigerant emitted from the first opening and the second opening substantially intersect each other.

11 Claims, 6 Drawing Sheets

(56) References Cited

U.S. PATENT DOCUMENTS

| | | | | |
|---|---|---|---|---|
| 6,367,265 B1* | 4/2002 | Yamamoto | ............... | F17C 7/04 62/50.2 |
| 6,729,386 B1* | 5/2004 | Sather | ................. | F28D 1/05316 165/110 |
| 8,522,449 B2* | 9/2013 | Tuck | .................... | F26B 17/026 34/179 |
| 9,027,676 B2* | 5/2015 | Nakashima | ........... | E02F 9/0866 123/41.56 |
| 9,234,604 B2* | 1/2016 | Kim | ....................... | F28F 27/02 |
| 9,528,778 B2* | 12/2016 | Liu | ........................ | F25B 39/00 |
| 2003/0010483 A1* | 1/2003 | Ikezaki | .................. | F28F 3/083 165/174 |
| 2006/0070401 A1* | 4/2006 | Bae | ...................... | F25B 39/022 62/504 |
| 2007/0039724 A1* | 2/2007 | Trumbower | .......... | F25B 39/028 165/174 |
| 2008/0092587 A1* | 4/2008 | Gorbounov | .......... | F25B 39/028 62/498 |
| 2008/0289806 A1* | 11/2008 | Gorbounov | .......... | F25B 39/028 165/173 |
| 2010/0282454 A1* | 11/2010 | Jiang | .................... | F25B 39/028 165/175 |
| 2011/0017438 A1* | 1/2011 | Huazhao | ............... | F25B 39/028 165/174 |
| 2011/0127023 A1* | 6/2011 | Taras | .................... | F28F 9/0273 165/173 |
| 2011/0203780 A1* | 8/2011 | Jiang | .................... | F28D 1/05366 165/173 |
| 2011/0290465 A1* | 12/2011 | Joshi | .................... | F28F 9/0273 165/175 |
| 2013/0199764 A1* | 8/2013 | Liu | ....................... | F25B 39/028 165/181 |
| 2013/0248158 A1* | 9/2013 | Gao | ....................... | F28F 9/027 165/143 |
| 2014/0102673 A1* | 4/2014 | Joardar | .................. | F28F 13/12 165/109.1 |
| 2016/0061497 A1* | 3/2016 | Chowdhury | ............ | F25B 39/00 62/515 |
| 2016/0169596 A1* | 6/2016 | Jindou | .................. | F25B 39/028 62/526 |
| 2016/0209091 A1* | 7/2016 | Zhou | .................... | F28F 9/0265 |
| 2016/0298887 A1* | 10/2016 | Alahyari | ............... | F25B 39/028 |

FOREIGN PATENT DOCUMENTS

| | | | |
|---|---|---|---|
| JP | 2013221680 A | * | 10/2013 |
| JP | 2013221681 A | * | 10/2013 |
| WO | 2009/139998 A2 | | 11/2009 |
| WO | 2015/027681 A1 | | 3/2015 |

* cited by examiner

HEAT EXCHANGER DISTRIBUTOR WITH INTERSECTING STREAMS

TECHNICAL FIELD OF INVENTION

This disclosure generally relates to a heat exchanger, and more particularly relates to a distributor configured to emit refrigerant in various directions so streams or jets of refrigerant cross or substantially intersect each other to reduce impingement noise.

BACKGROUND OF INVENTION

It is known to install a distributor within a manifold or header of a heat exchanger such as an evaporator to more uniformly distribute refrigerant within the header. More uniform distribution provides for more uniform temperature across the heat exchanger which improves overall performance of the heat exchanger. However, a disadvantage of known distributor configurations is that the high velocity jets of refrigerant emitted by the known distributors impinge on the interior surface of the header and cause undesirable noise.

SUMMARY OF THE INVENTION

Described herein is a distributor tube that improves the distribution of refrigerant with a header or manifold of a heat exchanger, and reduces the fluid (refrigerant) impingement energy on the interior structure of the header. The distributor is configured to emit intersecting jets of refrigerant to reduce the resulting momentum of the refrigerant impacting the inner surface of the header and thereby spread the energy over a wider area. This is achieved by creating a series of holes in the distributor that are angled in such a manner that the resultant jets of refrigerant will intersect each other upon exiting the distributor.

In accordance with one embodiment, a heat exchanger is provided. The heat exchanger includes a header, a plurality of tubes, and a distributor. The header is configured to define an inlet for the heat exchanger. The tubes extend away from and are fluidicly coupled to the header. The distributor is located within the header and is configured to distribute refrigerant flowing along a longitudinal axis from the inlet to the tubes via a plurality of openings defined by the distributor through a wall of the distributor. The openings include a first opening configured to direct refrigerant in a first direction, and a second opening configured to direct refrigerant in a second direction. The first direction and the second direction are selected such that refrigerant emitted from the first opening and the second opening substantially intersect each other.

In another embodiment, a distributor for a heat exchanger is provided. The distributor is located within a header of the heat exchanger and configured to distribute refrigerant flowing along a longitudinal axis from an inlet of the heat exchanger to tubes of the heat exchanger via a plurality of openings defined by the distributor through a wall of the distributor. The distributor includes a first opening and a second opening. The first opening is configured to direct refrigerant in a first direction. The second opening is configured to direct refrigerant in a second direction. The first direction and the second direction are selected such that refrigerant emitted from the first opening and the second opening substantially intersect each other.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figures 1, 1A:
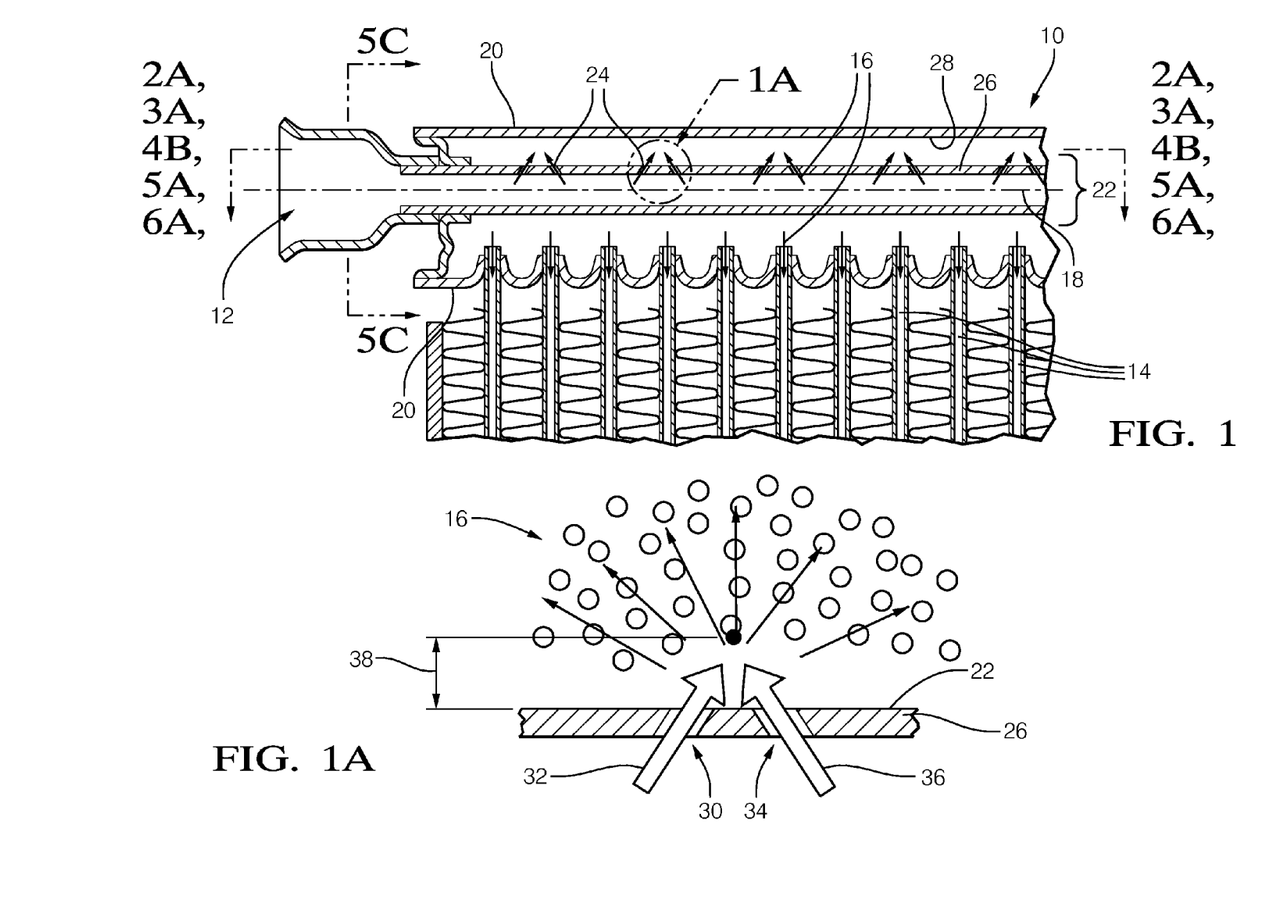
FIG. 1 is a cut-away side view of a heat exchanger equipped with a distributor in accordance with one embodiment.

FIG. 1 illustrates a non-limiting example of a heat exchanger 10. The examples presented herein are generally directed to an evaporator used in a vehicle air-conditioning system. However, it is contemplated that the teachings presented herein to reduce impingent noise and more uniformly distribute coolant or refrigerant are applicable to other types of heat exchangers.

The heat exchanger 10 includes a header 20 (a.k.a. manifold) configured to define an inlet 12 for the heat exchanger 10. While not shown, it is contemplated that the inlet 12 may include a flange or pressure regulator, as will be recognized by those in the art. The heat exchanger 10 also includes a plurality of tubes 14 extending away from and fluidicly coupled to the header 20. Typically, other ends (not shown) of the tubes 14 are coupled to another header (not shown), as will be recognized by those in the art. In this example, refrigerant 16 is illustrated as flowing upward from the distributor tube. The velocity of the refrigerant emitted from the openings of the distributor causes it to contact the inner surface of the upper portion off the header and then flow to the bottom of the header, and enter the refrigerant tubes. The flow may be directed straight upwards or it may also be directed some angle from vertical. These angles include 45 degrees in the positive and negative directions from vertical.

The heat exchanger 10 includes a distributor 22 located within the header 20. The header 20 is configured to distribute refrigerant 16 flowing along a longitudinal axis 18 from the inlet 12 to the tubes 14 via a plurality of openings 24 defined by the distributor 22 through a wall 26 of the distributor 22. The openings 24 include a first opening 30 configured to direct refrigerant in a first direction 32, and a second opening 34 configured to direct refrigerant in a second direction 36, wherein the first direction 32 and the second direction 36 are selected such that refrigerant 16 emitted from the first opening 30 and the second opening 34 substantially intersect.

As used herein, substantially intersect means that streams or jets of refrigerant are aimed by the first opening 30 and the second opening 34 such a majority, at least 75% for example, of refrigerant emitted from the first opening 30 crosses paths with a majority of refrigerant emitted from the second opening 34 before the refrigerant emitted by either opening impinges on an inner surface 28 of the header. In other words, the refrigerant 16 from adjacent openings collide and thereby dissipate kinetic energy. It has been observed that by crossing or intersecting the streams or jet of refrigerant emitted by adjacent openings, the jet impingement energy on the manifold is reduced. Reducing the energy transferred to the manifold, reduces structural excitation and the noise associated with it. Another benefit of crossing or intersecting the streams or jets of refrigerant emitted by adjacent openings is enhanced refrigerant distribution in the heat exchanger, leading to improved performance.

The openings 24 may be configured to emit a 'pencil stream' or relatively focused jet of refrigerant, or a relatively distributed pattern such as a conical or fan pattern. The degree of noise reduction is particularly evident when the pencil stream from one opening is aimed to intersect or cross paths with the pencil stream from another opening. However, noise reduction is still realized if the pattern of refrigerant emitted by an opening is less focused (i.e. more spread out) as compared to the pencil stream. In order to reduce the velocity of refrigerant impinging on the inner surface 28, the first direction 32 and the second direction 36 may be selected such that refrigerant emitted from the first opening 30 and the second opening 34 substantially intersect a location characterized by a radial distance 38 away from the distributor. The radial distance 38 is preferably selected so the streams from the openings cross or intersect well before they impinge on the inner surface 28 so the noise reduction benefits of intersecting the streams are well realized.

While examples of the distributor 22 illustrated herein are shown as being tubular in shape, the configuration of the distributor is not limited to a tubular shape. The distributor may be formed by rolling sheet metal into a tube shape and forming a weld seam parallel to the longitudinal axis 18. As will become apparent in the further description of the distributor that follows, this process may be advantageous so the openings 24 can be partially or fully formed prior to rolling the sheet metal into a tubular shape. Alternatively, the distributor 22 may start out more like a pipe or other closed shape, and have the openings 24 formed by, for example, drilling the openings 24 into the pipe and through the wall 26.

Figure 2A:
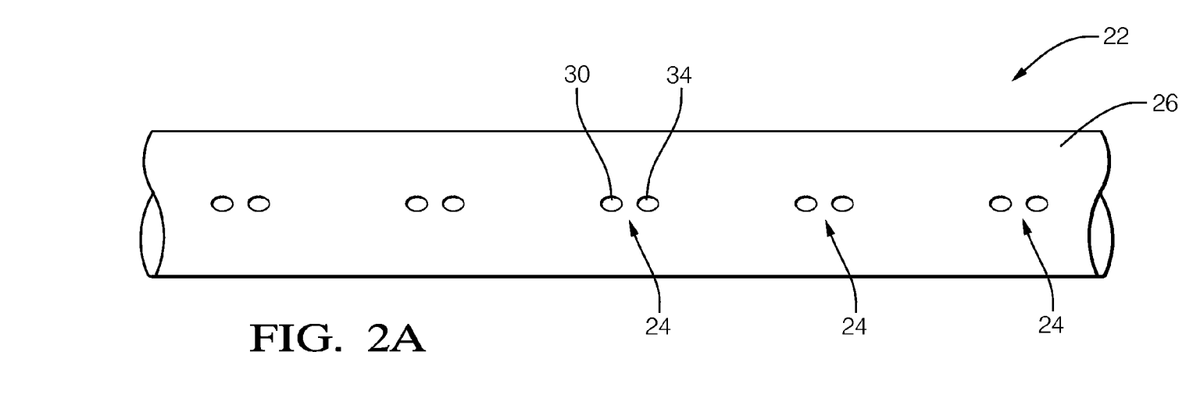
FIGS. 2A and 2B are, respectively, a top view and sectional side view of a distributor for the heat exchanger of FIG. 1 in accordance with one embodiment.
Figure 2B:
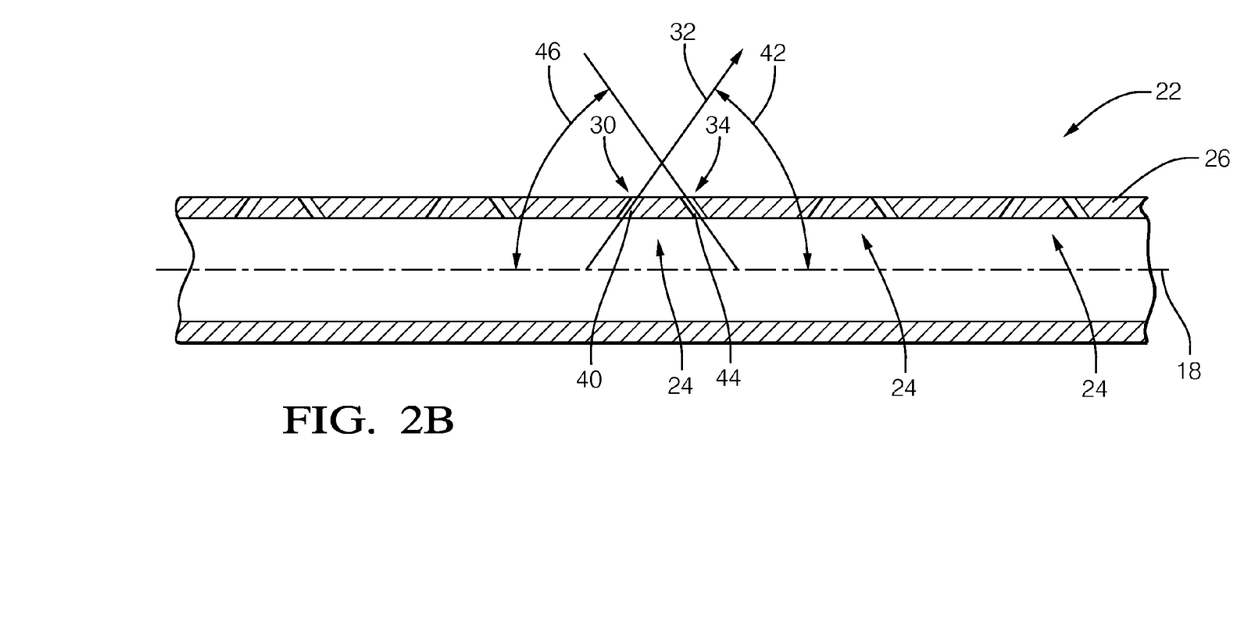

FIGS. 2A and 2B illustrate a non-limiting example of a portion of the distributor 22. In this example, the openings 24 are similar to what would be provided by drilling. That is, the openings 24 are round and oriented at some angle relative to the longitudinal axis 18. As such, the first opening 30 may be generally characterized by a first drilled passageway 40 through the wall 26, wherein a first angle 42 of the first drilled passageway 40 determines the first direction 32. Similarly, the second opening 34 may be generally characterized by a second drilled passageway 44 through the wall 26 at a second angle 46. By way of example and not limitation, the second angle may be characterized as complementary to the first angle relative to the longitudinal axis 18. As used here, complementary means that the magnitudes of the first angle 42 and the second angle 46 are equal, or as equal as is possible with typical manufacturing processes. While the openings 24 in this example are characterized as being drilled, it is contemplated that similar openings could be formed by broaching, punching, or piercing; and so may be a shape other than round, as will be recognized by those in the art.

Figure 3A:
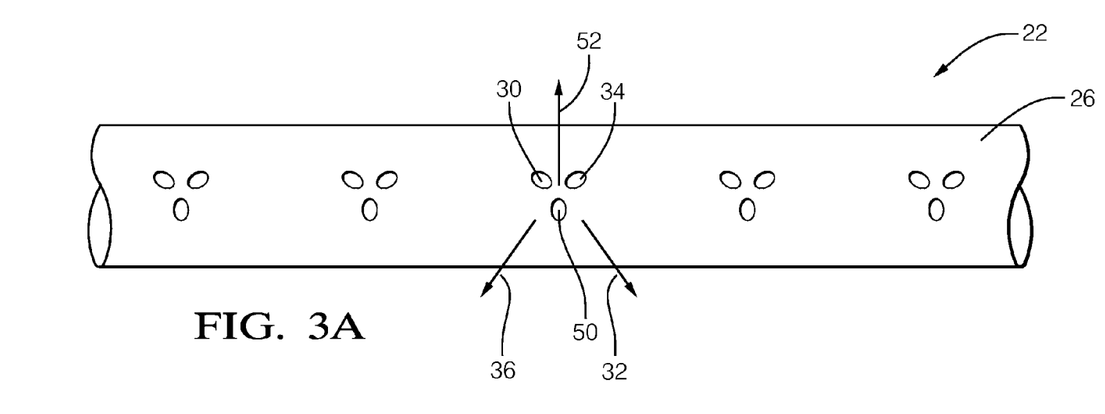
FIGS. 3A and 3B are, respectively, a top view and sectional side view of a distributor for the heat exchanger of FIG. 1 in accordance with one embodiment.
Figure 3B:
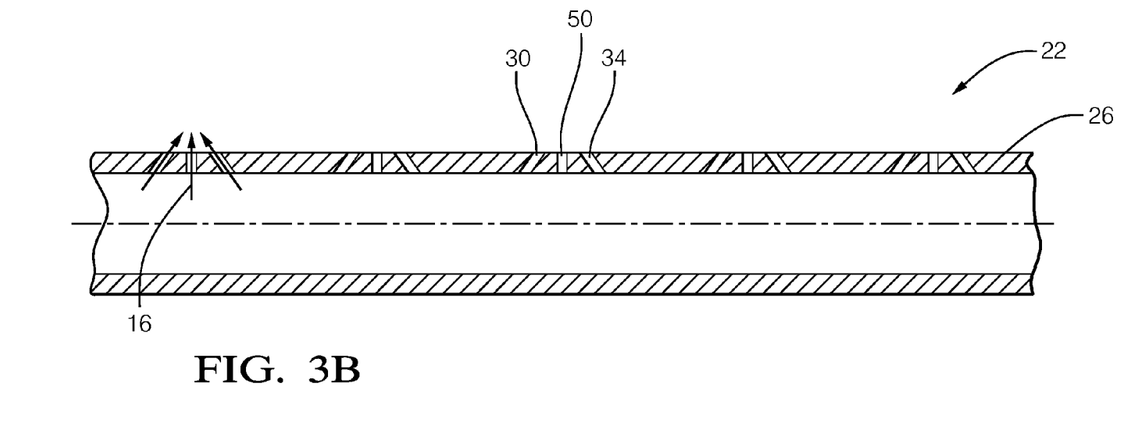

FIGS. 3A and 3B illustrate a non-limiting example of a portion of the distributor 22 that includes a third opening 50 configured to direct refrigerant in a third direction 52. In this example the first opening 30, the second opening 34, and the third opening 50 are arranged to form a triangle as can be seen. Accordingly, the first direction 32, the second direction 36, and the third direction 52 are selected such that refrigerant 16 emitted from the first opening 30, the second opening 34, and the third opening 50 all substantially intersect before impinging on the inner surface 28 (FIG. 1) of the header 20.

Figure 4A:
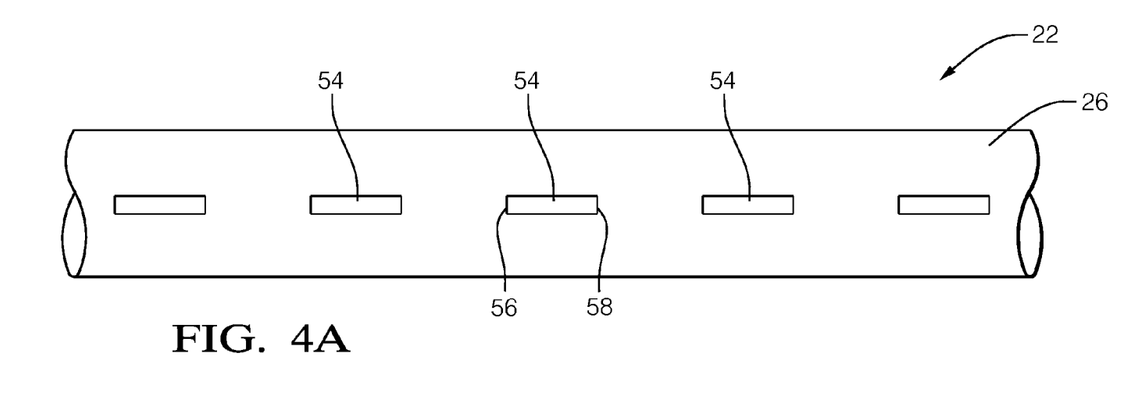
FIGS. 4A and 4B are top views of, respectively, a partially formed and fully formed distributor for the heat exchanger of FIG. 1 in accordance with one embodiment.
Figure 4B:
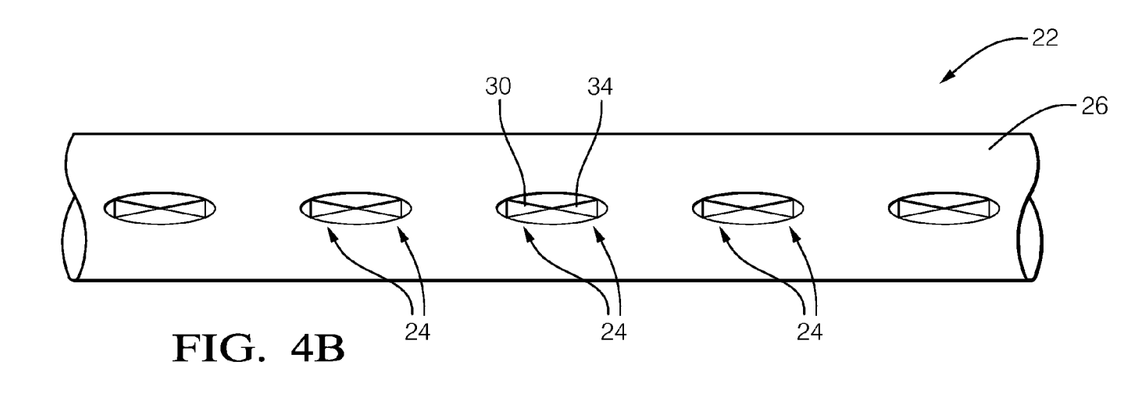
Figure 5A:
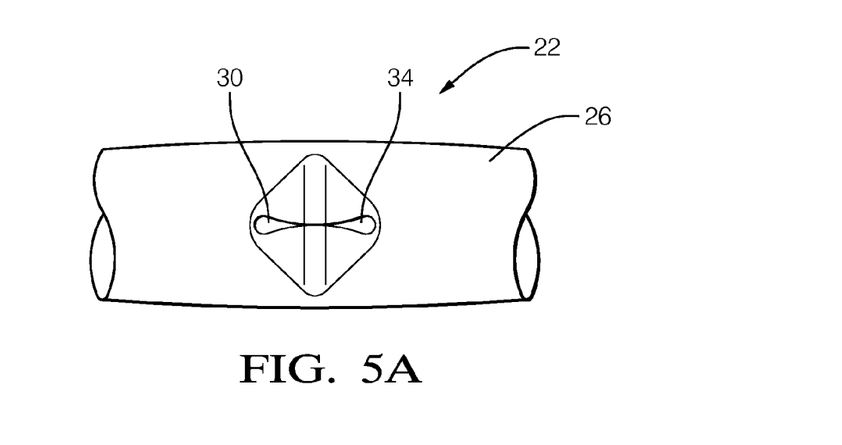
FIGS. 5A, 5B, and 5C are, respectively, a top view, a side view and a sectional end view of a distributor for the heat exchanger of FIG. 4B.
Figure 5B:
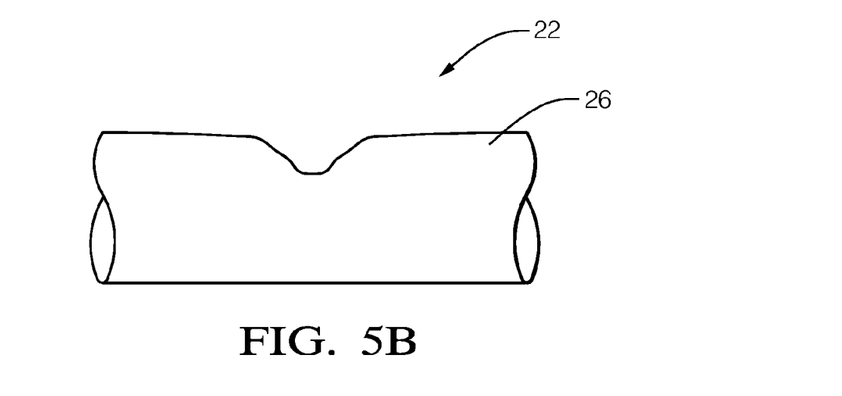
Figure 5C:
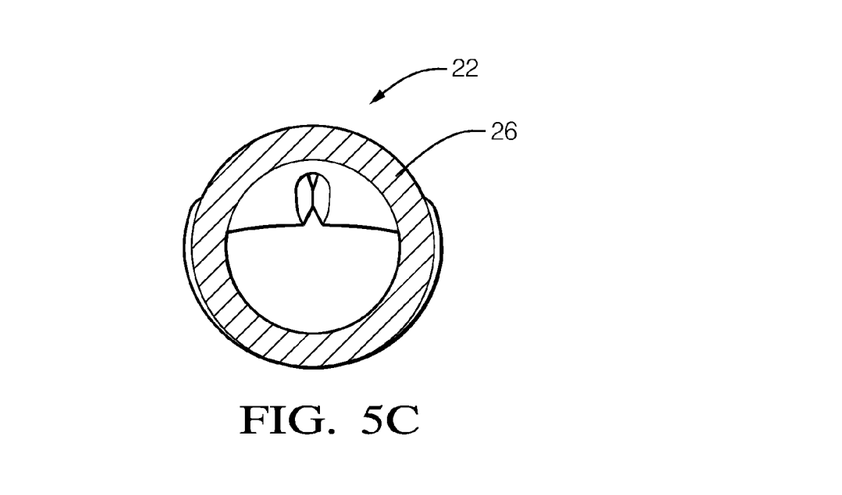

FIGS. 4A, 4B, 5A, 5B, and 5C illustrate a non-limiting example of a portion of the distributor 22 where the openings 24 are formed by first cutting, broaching, stamping, or otherwise machining the slots 54 into the material used to form the distributor 22. The slots 54 may be formed prior to rolling sheet metal into the desired shape for the distributor 22, or the slots 54 may be formed into shaped material such as a pipe used to fabricate the distributor 22. In this example, the surface viewed in FIGS. 4A and 4B is preferably curved so a subsequent processing step can be used to collapse or pinch the slot 54 and thereby form the first opening 30 and the second opening 34 illustrated in FIG. 5A. That is, the first opening 30 and the second opening 34 are formed from a slot 54 defined by the distributor 22 through the wall 26. The first opening 30 may be characterized as proximate to a first end 56 of the slot 54, and the second opening 34 may be characterized as proximate to a second end 58 of the slot 54. The first opening 30 is segregated from the second opening 34 when the wall 26 proximate to the slot 54 is deformed as illustrated in FIGS. 5A-5C. The distributor 22 may be deformed as illustrated by supporting the distributor 22 in a cradle like tool and pressing a suitably shaped tool to pinch the edges of the slot 54 together and thereby segregate the first opening 30 from the second opening 34.

Figure 6A:
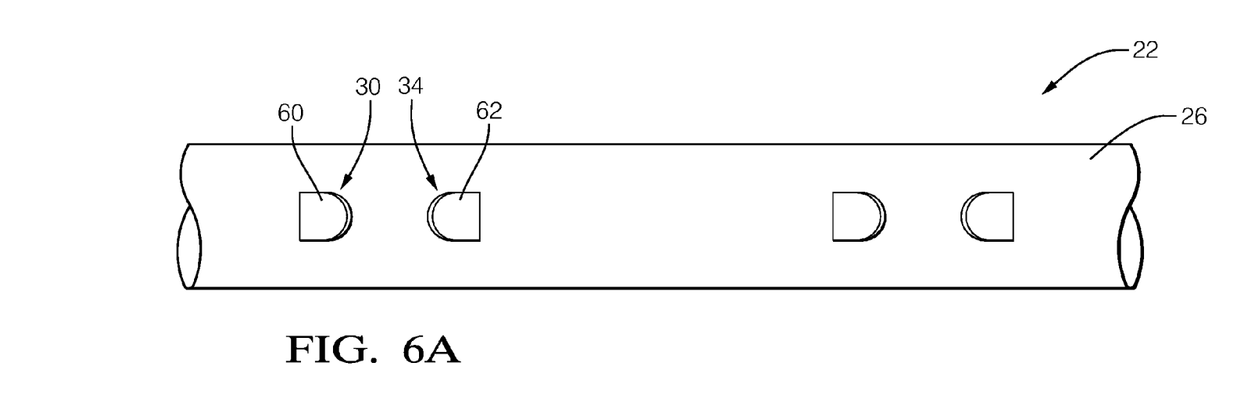
FIGS. 6A and 6B are, respectively, a top view and sectional side view of a distributor for the heat exchanger of FIG. 1 in accordance with one embodiment.
Figure 6B:
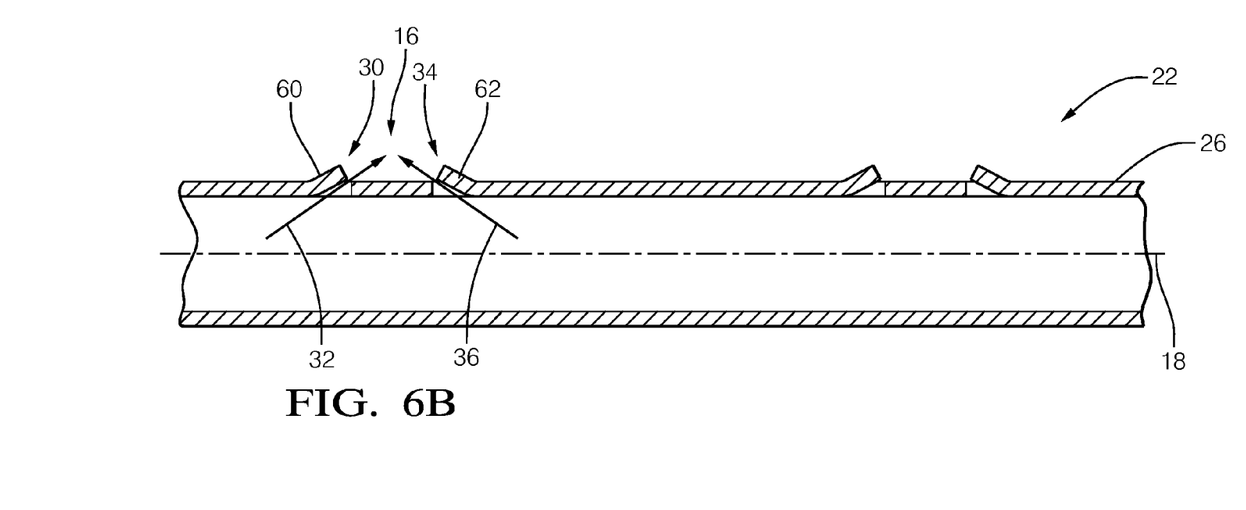

FIGS. 6A and 6B illustrate a non-limiting example of a portion of the distributor 22 where the first opening 30 is defined by a first tab 60 formed from the wall 26. The first tab 60 is preferably formed in the material used for the distributor 22 while the material still in a flat state, i.e. prior to rolling into a tubular shape. However, it is recognized that machining processes are available to form the first tab 60 into a preformed tubular shape. The first tab 60 is oriented in a first orientation and the second opening 34 is defined by a second tab 62 formed from the wall 26 and oriented in a second orientation complementary (e.g. opposite) to the first orientation relative to the longitudinal axis 18. That is, the first tab 60 and the second tab 62 are oriented so the first direction 32 and the second direction 36 are selected such that refrigerant 16 emitted from the first opening 30 and the second opening 34 substantially intersect.

Accordingly, a heat exchanger 10, and a distributor 22 for the heat exchanger 10 are provided. By having the refrigerant 16 from adjacent openings intersect (i.e. cross paths or collide), the momentum of the jet or stream of refrigerant is reduced from the openings 24. As such, the impingement energy of the refrigerant 16 impinging on the header 20 is reduced. This provides for reduced noise and better atomized spray to enhance refrigerant distribution in the heat exchanger 10.

While this invention has been described in terms of the preferred embodiments thereof, it is not intended to be so limited, but rather only to the extent set forth in the claims that follow.

We claim:

1. A heat exchanger comprising:
a header configured to define an inlet for the heat exchanger;
a plurality of tubes extending away from and fluidly coupled to the header; and
a distributor located within the header and configured to distribute refrigerant flowing along a longitudinal axis from the inlet to the tubes via a plurality of openings defined by the distributor through a wall of the distributor, wherein the openings include a first opening extending through the wall in a first direction, and second opening is offset along the longitudinal axis from the first opening and extending through the wall in a second direction, wherein the first direction and the second direction are tilted relative to a radial direction such that the first direction and the second direction intersect outside of the distributor and that refrigerant emitted from the first opening and the second opening substantially intersect each other.

2. The heat exchanger in accordance with claim 1, wherein the first direction and the second direction are selected such that refrigerant emitted from the first opening and the second opening substantially intersect a location characterized by a radial distance away from the distributor.

3. The heat exchanger in accordance with claim 1, wherein the first opening is characterized by a first drilled passageway through the wall, wherein a first angle of the first drilled passageway determines the first direction.

4. The heat exchanger in accordance with claim 3, wherein the second opening is characterized by a second drilled passageway through the wall, wherein a second angle is characterized as complementary to the first angle relative to the longitudinal axis.

5. The heat exchanger in accordance with claim 1, wherein the distributor includes a third opening configured to direct refrigerant in a third direction, wherein the first direction, the second direction, and the third direction are selected such that refrigerant emitted from the first opening, the second opening, and the third opening all substantially intersect.

6. The heat exchanger in accordance with claim 5, wherein the first opening, the second opening, and the third opening are arranged to form a triangle.

7. The heat exchanger in accordance with claim 1, wherein the first opening and the second opening are formed from a slot defined by the distributor through the wall, wherein the first opening is proximate to a first end of the slot, and the second opening is proximate to a second end of the slot.

8. The heat exchanger in accordance with claim 1, wherein the first opening is segregated from the second opening when the wall proximate to the slot is deformed.

9. The heat exchanger in accordance with claim 1, wherein the first opening is defined by a first tab formed from the wall.

10. The heat exchanger in accordance with claim 9, wherein the first tab is oriented in a first orientation and the second opening is defined by a second tab formed from the wall and oriented in a second orientation complementary to the first orientation relative to the longitudinal axis.

11. A distributor for a heat exchanger located within a header of the heat exchanger and configured to distribute refrigerant flowing along a longitudinal axis from an inlet of the heat exchanger to tubes of the heat exchanger via a plurality of openings defined by the distributor through a wall of the distributor, said distributor comprising: a first opening extending through the wall in a first direction; and a second opening extending through the wall in a second direction, wherein the first direction and the second direction are selected such that refrigerant emitted from the first opening and the second opening substantially intersect each other;
a first opening and a second opening, the first opening extending outward through the wall in a first direction tilted toward the second opening, and wherein the second opening is offset along the longitudinal axis from the first opening and extends outward through the wall in a second direction tilted toward the first opening.

* * * * *